United States Patent

[11] 3,558,143

[72] Inventors Gunars Licitis
Lombard;
Peter Aleksa; Marvin I. Glass, Chicago, Ill.

[21] Appl. No. 739,313
[22] Filed June 24, 1968
[45] Patented Jan. 26, 1971
[73] Assignee Marvin Glass & Associates
Chicago, Ill.
a partnership

[54] SOUND REPRODUCING MEANS
5 Claims, 9 Drawing Figs.

[52] U.S. Cl. .......... 274/11
[51] Int. Cl. .......... G11b 21/08, G11b 25/06
[50] Field of Search .......... 274/1.1, 11, 4, 43

[56] References Cited

UNITED STATES PATENTS

| | | | |
|---|---|---|---|
| 1,219,752 | 3/1917 | Majorana | 274/11 |
| 1,998,149 | 4/1935 | Warner | 274/1(.1) |
| 2,275,961 | 3/1942 | Heller | 179/100.2(MX) |
| 2,287,377 | 6/1942 | Gallier | 274/11 |
| 2,546,680 | 3/1951 | Samuels | 274/11X |

*Primary Examiner*—Harry N. Haroian
*Attorney*—James F. Coffee

ABSTRACT: A sound reproducing means for use with a tape recording of the type having sound grooves adapted for engagement by a stylus. The tape portion includes a plurality of messages or sounds arranged in generally parallel grooves, and the tape is adapted to be wound on a reel mounted for rotation within a housing which also includes a stylus or needle and a sound diaphragm associated with the needle. The tape recording is disposed for manual movement across the point of the stylus, to thereby effect reproduction of one of the recorded messages, and the tape reel is spring-biased to effect rewinding of the tape after it has been withdrawn from the housing and then released.

INVENTORS
GUNARS LICITIS
PETER ALEKSA
MARVIN I. GLASS

BY James F. Coffee
ATTORNEY

INVENTORS
GUNARS LICITIS
PETER ALEKSA
MARVIN I. GLASS

BY James F. Coffee
ATTORNEY

SOUND REPRODUCING MEANS

BACKGROUND OF THE INVENTION

Various means have been devised for effecting reproduction of sound messages recorded on a length of tape, including means for acoustically reproducing sounds or messages formed in linear grooves. The present invention is particularly directed to an improved form of mechanism which provides for random reproduction of a plurality of sound messages on a single tape recording, and wherein the tape is pulled manually across a stylus and is self-winding upon its release.

SUMMARY OF THE INVENTION

A sound reproducing means for use with a tape recording and comprising a housing, a reel mounted in the housing for rotation relative thereto, a tape having a plurality of recorded messages arranged thereon in generally parallel sound grooves, said tape being fixed at one end to the reel and normally wound on the reel with the outer free end portion of the tape extending from the housing, spring means within the housing for biasing said reel so as to wind the tape on the reel, a vibratable diaphragm carried by the housing, and a stylus associated with the diaphragm for the transmission of vibrations thereto, with the stylus positioned for engagement by the tape as the latter is moved outwardly of the housing.

DESCRIPTION OF THE PREFERRED EMBODIMENT

Figures 1, 2, 3, 4:
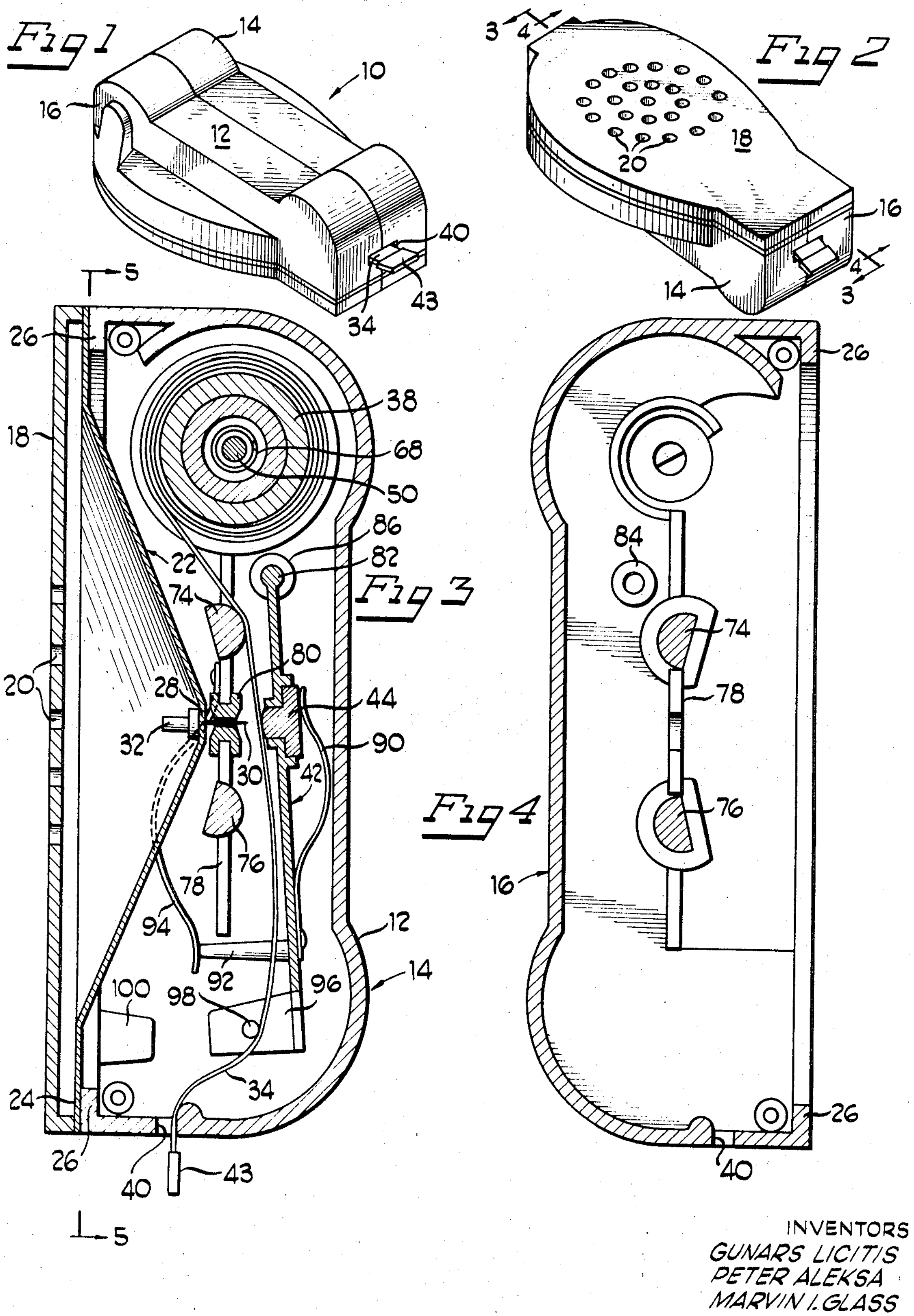
FIG. 1 is a perspective bottom view of the sound reproducing means.
FIG. 2 is a perspective top view of the sound reproducing means.
FIG. 3 is an enlarged sectional view taken along the line 3–3 in FIG. 2.
FIG. 4 is an enlarged sectional view taken along the line 4–4 in FIG. 2, with portions omitted.

With reference particularly to FIGS. 1—3, it will be seen that the sound reproducing means 10 embodying the invention comprises generally a closed housing 12 formed generally of two halves 14 and 16 which are joined lengthwise and provided with a top wall or cover 18 having a plurality of openings 20 therein to permit the passage of sound therethrough. An acoustical diaphragm 22 is supported within the main housing portion, with the marginal edge 24 of the diaphragm held between the perforated cover 18 and an underlying ledge 26 on the main housing portion. The diaphragm 22 is generally in the shape of a cone of oval cross section, and the apex 28 of the cone is flattened to provide a mount or support for a stylus or needle 30 having a shank portion 32 fixed to the apex of the cone with the pointed end of the needle piercing the diaphragm and extending toward wall 12 of the housing. A tape 34 of plastic or other recordable material is provided with a plurality of parallel sound grooves 36 (FIG. 5) and is wound on a spring-biased reel 38 carried at one end of the housing. The free end of tape 34 is extended across the length of the housing 12 and through a slotted opening 40 provided at the end opposite the reel 38. A tab 43 or the like is fixed to the free end of tape 34 to prevent its complete withdrawal into housing 12.

A pivotally mounted lever 42 is disposed within the housing 12 and serves as a guide means for tape 34, and lever 42 also includes a pressure pad 44 which is adapted to provide a predetermined amount of pressure against the tape when the latter is engaged by the stylus 30. Consequently, as the free end of tape 34 is pulled outwardly of housing 12, the lever 42 and pressure pad 44 provide backup or support for the tape to maintain its engagement with the stylus. When the tape has been withdrawn, preferably to its fullest extend, and then released, the spring-biased reel 38 serves to draw the tape back into the housing and wind it on the reel. Since the reel 38 is substantially wider than the width of the tape 34, as is the slot 40 in the end of housing 12, the selection of the message reproduced by stylus 30 is determined by the lateral position of the tape relative to the stylus as the tape is being withdrawn from the housing.

With reference also to FIGS. 5—9, a more detailed description of the sound reproducing mechanism will now be given. The lower or main portion of housing 12 includes means at one end thereof for fixedly mounting a shaft 50 in transverse relation to the housing. Such means is in the form of a pair of aligned, semicylindrical openings in opposite wall portions 52, 54 of housing 12 for receiving complementary semicylindrical end portions of the reel supporting shaft 50. As illustrated particularly in FIG. 6, the reel 38 is made in three sections 56, 58 and 60 providing a hollow portion 62 along the length of shaft 50 and including a pair of outer flanged portions 64 and 66 for supporting the coiled tape recording 34. A coil spring 68 is disposed along the reel shaft 50 in concentric relation thereto, with one end of the spring 68 fixed in a slotted portion 70 of shaft 50 and the other end fixed to the relatively rotatable reel 38. The inner end of tape 34 is fixed to reel 38 and wound thereon in a manner such that an unwinding movement of the tape winds the spring 68 relative to the fixed shaft 50. Such winding of spring 68 provides for storing of energy which serves to reverse the rotation of reel 38 and rewind the tape on the reel when tape 34 is released from an extended position outside of housing 12.

Figures 5, 6, 7, 8, 9:
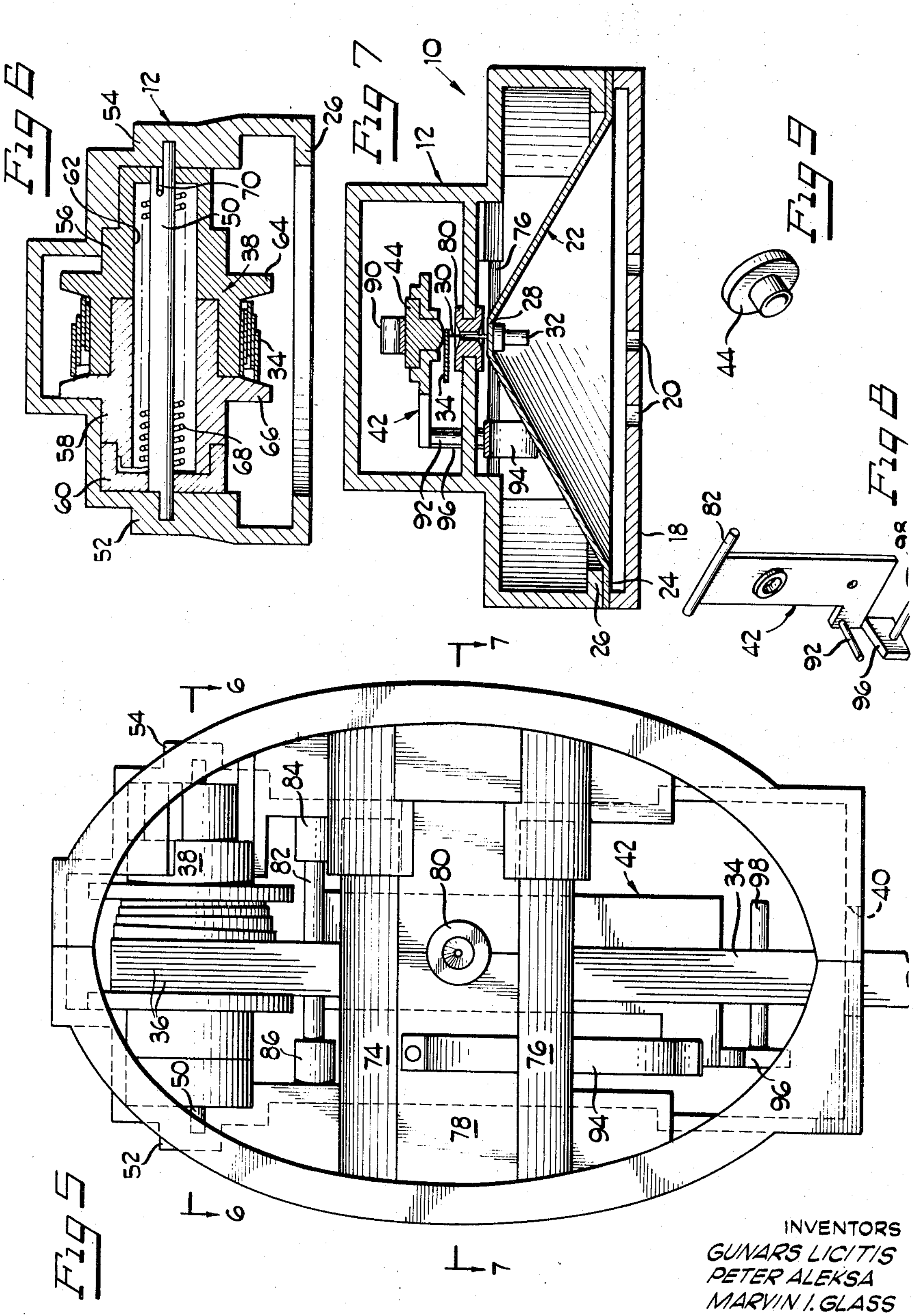
FIG. 5 is a sectional view taken along the line 5–5 in FIG. 3, with the diaphragm removed.
FIG. 6 is a sectional view taken along the line 6–6 in FIG. 5.
FIG. 7 is a sectional view taken along the line 7–7 in FIG. 5, with parts shown in a different, operative position and including a portion of the diaphragm.
FIG. 8 is a perspective view of a portion of the structure seen particularly in FIG. 3.
FIG. 9 is an enlarged perspective view of another structural element seen in FIG. 3.

The path of the tape 34 through housing 12 is defined in part by a pair of arcuate-shaped ribs 74, 76 (FIG. 3) extending transversely of the housing on opposite sides of the stylus 30. Ribs 74 and 76 are formed integrally with a transverse shelf or wall 78 fixed to opposite sides of the housing. A center portion of shelf 78 is provided with a circular opening in which is mounted a generally circular stylus guide portion 80, preferably of a relatively rigid and abrasion-resistant material, having a central opening slidably receiving the stylus or needle 30. Stylus 30 has its shank portion 32 cemented or otherwise secured to apex 28 of the cone 22. The pivotally mounted lever 42, as seen particularly in FIG. 8, is a generally flat member having a pivot pin 82 formed at one end which is journaled at its opposite ends (FIG. 5) in bosses 84, 86 provided on opposite sidewalls of housing 12. An intermediate section of lever 42 has a cylindrical opening formed therein providing a seat for pressure pad 44. Pad 44 is a generally cylindrical part, which may be of metal or other suitable material, and is slidably received in the opening in lever 42. Pad 44 is provided with an enlarged head portion so as to limit the movement of the pad in the direction of stylus 30 (FIG. 3). Further, a relatively light and arcuately bent spring 90 is fixed to lever 42 with its free end in engagement with the head of pressure pad 44, so as to yieldably resist movement of the latter in a direction away from the stylus. Lever 42 is normally held in elevated relation to stylus 30 through engagement of a depending arm or pin 92 with the free end of another arcuate spring 94 which is fixed at one end to shelf 78 within the housing. A transversely formed arm section 96 at the free end of lever 42 includes a pin 98 serving as a guide and support for the outer end of tape 34 immediately preceding its point of exit through the slotted opening 40 in the end of housing 12. As indicated previously, the free end of tape 34 is provided with the tab 43 having a width sufficiently great to prevent withdrawal of the tape through opening 40 and into the housing. A boss 100 is disposed within housing 12 in position for engagement by the end of arm 96, so as to limit the movement of lever 42.

Consequently, it is seen that tape 34 is provided with a plurality of generally parallel sound grooves 36 thereon, and the tape and lever 42 are normally disposed as seen in FIG. 3. In such position, the biasing spring 68 for tape reel 38 is relaxed, lever 42 is elevated away from the stylus 30 under the biasing action of leaf spring 94, and the lead portion of tape 34 is disposed away from stylus 30 by virtue of its support on the arcuate pad 74 and pin 98 at the end of lever 42. As tab 43 is grasped and tension applied to the tape, the lever arm 42 is pivoted in the direction of stylus 30, by engagement of the tape with pin 98 at the free end of the lever arm. The lever arm moves downwardly in opposition to the biasing of the spring 94 until the tape section bridging the stylus mount rests on the two arcuate ribs 74, 76. At such time, the stylus 30 engages one of the recorded grooves 36 on the tape and pressure pad 44 yieldably holds the tape into its position of engagement with the point of the stylus 30. Linear motion of the tape is therefore effective to provide for reproduction of a sound message as stylus 30 is vibrated and such vibrations are transmitted to the acoustical diaphragm 22.

The withdrawal of tape 34 from housing 12 coils the spring 68 around shaft 50, so that release of the extended tape causes reel 38 to rewind the tape and draw it into housing 12 until stopped by the tab end 43 engaging the housing wall. When the extended tape is released, the pressure on lever arm 42 and spring 94 is also withdrawn and leaf spring 94 serves to immediately pivot the lever arm away from stylus 30 and disengage the tape from contact with the stylus. Consequently, no sound message is reproduced while the tape is being withdrawn into the housing 12.

It is seen, therefore, that there is provided herein a simple and inexpensive device for acoustically reproducing sound from a length of tape recording. Further, the device provides for the use of a relatively wide tape which has a plurality of parallel sound grooves recorded thereon, and the manipulation of the tape transversely of the slotted opening 40 results in a transverse shifting of the tape within the housing, so that different ones of the plurality of messages on the tape can be reproduced. Since the transverse motion of tape 34 is not positively guided, and is only limited by the width of slot 40, the user will be unable to accurately determine in advance just what message will be reproduced and, therefore, there is a random playing of the messages on the tape as the latter is repeatedly withdrawn from the housing.

Although shown and described with respect to particular apparatus, it will be apparent that various modifications might be made without departing from the principles of the invention.

We claim:

1. A sound reproducing means for use with a tape recording comprising a housing, a reel mounted in said housing for rotation relative thereto, a tape having a plurality of recorded messages arranged thereon in generally parallel sound grooves, said tape being fixed at one end to said reel and mounted thereon in a manner affording lateral shifting of the tape on said reel and within the housing, so that engagement of a stylus with one of said grooves is maintained throughout the outward movement of the tape relative to the housing s the outer free end portion of the tape extending through an opening in the housing, spring means within said housing biasing said reel so as to wind the tape on the reel, a vibratable diaphragm carried by the housing, a stylus associated with the diaphragm for the transmission of vibrations thereto, said stylus being positioned for random engagement by said tape as the latter is shifted laterally and moved outwardly of said housing, and said housing opening being sufficiently wider than said tape to permit lateral shifting of the tape to cause engagement of said stylus with any one of said sound grooves.

2. A sound reproducing means as set forth in claim 1, including a pivotally mounted lever within said housing which is operable to press said tape against said stylus in response to the application of tension on the free end of the tape and to disengage said tape from said stylus when said tension is removed.

3. A sound reproducing means as set forth in claim 2, including a spring biased pressure pad carried by said lever in position for holding the tape against said stylus.

4. A sound reproducing means as set forth in claim 1, wherein said diaphragm is generally oval in cross section and includes a small, flat portion at its apex, and said stylus is fixed to said flat portion of the diaphragm.

5. A sound reproducing means for use with a tape recording comprising a housing, a reel mounted in said housing for rotation relative thereto, a tape having a plurality of recorded messages arranged thereon in generally parallel sound grooves, said tape being fixed at one end to said reel and adapted to be wound on the reel with the outer free end portion of the tape extending through an opening in the housing, said reel having a width greater than said tape to permit shifting of said tape laterally thereof, said housing opening having a width greater than the width of said tape spring means within said housing biasing said reel so as to wind the tape on the reel, a vibratable diaphragm carried by the housing, a stylus associated with the diaphragm for the transmission of vibrations thereto, said stylus being positioned for engagement with said tape as the latter is moved outwardly of said housing.